US005577753A

United States Patent [19]
Pociask

[11] Patent Number: 5,577,753

[45] Date of Patent: Nov. 26, 1996

[54] WHEELCHAIR AND COMMODE SEAT THEREFOR

[76] Inventor: Edward M. Pociask, 408 W. Walnut, Mt. Prospect, Ill. 60056

[21] Appl. No.: 527,927

[22] Filed: Sep. 14, 1995

[51] Int. Cl.[6] ........ B62M 1/14

[52] U.S. Cl. ........ 280/250.1; 280/304.1; 297/DIG. 4

[58] Field of Search ........ 280/250.1, 304.1; 297/DIG. 4; 4/479, 480, 483, 484

[56] References Cited

U.S. PATENT DOCUMENTS

| | | | |
|---|---|---|---|
| 3,937,490 | 2/1976 | Nasr | 280/250.1 |
| 4,067,409 | 1/1978 | DiMatteo et al. | 297/DIG. 4 X |
| 4,343,482 | 8/1982 | Wegner | 280/47.4 X |
| 4,514,867 | 5/1985 | Jensen | 297/DIG. 4 X |
| 4,949,408 | 8/1990 | Trkla | 297/DIG. 4 X |
| 5,039,165 | 8/1991 | Rothman et al. | 297/DIG. 4 X |
| 5,255,934 | 10/1993 | Wilson | 280/304.1 X |
| 5,285,535 | 2/1994 | Stewart et al. | 297/DIG. 4 X |
| 5,380,034 | 1/1995 | Wilson | 297/DIG. 4 X |
| 5,423,562 | 6/1995 | Pearce, Jr. | 280/250.1 |

*Primary Examiner*—Kevin Hurley
*Attorney, Agent, or Firm*—Charles F. Lind

[57] ABSTRACT

The disclosed wheelchair has spaced side structures and movable seat frame bars, and X-cross braces interconnect them for movement between wheelchair opened and collapsed positions. A flexible durable seat panel secured along panel side edges to the seat frame bars has an opening spaced from its front, rear and side edges, defining broad side and rear support regions between the opening and the corresponding panel edges for comfortable long term occupant support. However, the occupant can shift along the seat panel to overlie the seat opening for toilet needs, without assistance and/or leaving the wheelchair. The seat frame bars and seat panel are located to pass with clearance over the top of a toilet bowl, the X-cross braces connect only the front of the side structures and seat frame bars so that rearwardly thereof and under the seat panel between the side structures no wheelchair structure exist, allowing the wheelchair to be rolled backwards to align the seat panel opening vertically over the toilet bowl. Pocket structure can be removably connected by mating hook-loop fastening components to the underside of the seat panel, suited to hold a potty pan operative under the seat opening, for toilet use without a toilet.

20 Claims, 3 Drawing Sheets

WHEELCHAIR AND COMMODE SEAT THEREFOR

BACKGROUND OF THE INVENTION

Many people, even though otherwise healthy and alert, can not stand but nonetheless do have sufficient upper body strength to sit up. They thus can sit in and even roll themselves around in a wheelchair, and take care of themselves quite independently for even sustained durations. However, if such a person is unable to safely get out of the wheelchair or stand without aid, it yet remains a challenge for him/her to independently take care of one's bathroom needs.

Commode chairs are available for making toilet use less risky for the weak, infirmed or like person, having a stable base and side arms, and a conventional but somewhat raised toilet seat. In most instances, a removable pan underlies the seat for catching the released waste, but some commode chairs can also be positioned with its chair seat over a conventional toilet bowl, to have the waste more conveniently discharged directly into the toilet. However, their existence does not resolve the toilet needs of an infirmed person yet lacking assistance in transferring back and forth between the commode chair and conventional wheelchair.

Some commode chairs further have wheels for rolling them around, with or without an occupant thereon. However, the chair seat is not suitably contoured or padded for yielding occupant comfort for long terms, making such known commode chairs impractical for use as a full time wheelchair.

Of importance further, a practical wheelchair should be easily and quickly collapsible to a compact size for storage or travel via a car trunk, back seat or the like.

SUMMARY OF THE INVENTION

This invention relates to wheelchairs, and specifically to such suited for universal use including for toilet use with a conventional toilet.

A basis object of this invention is to provide a wheelchair suited for universal use allowing an occupant thereof to sit comfortably over sustained periods and to take care of toilet needs without assistance and without having to stand and/or transfer from the wheelchair to a different toilet facility.

Another object of this invention is to provide a wheelchair as above noted that can be collapsed and opened easily, for use at different sites involving the need for a compact configuration for storage and travel.

Another object of this invention is to provide a wheelchair seat panel that can be attached to a wheelchair suited for universal occupant use including sitting with comfort even over sustained periods, and taking care of toilet needs without assistance and without having to transfer from the wheelchair to a different toilet facility.

Another object of this invention is to provide a wheelchair seat panel that is flexible and durable and that has an opening therein spaced from the front, rear and side edges, and said seat panel with the side structures opened being drawn to stretched although not really tight or flat configurations allowing a wheelchair occupant to be carried on the seat panel on at least rear and side support regions thereof between the opening and the corresponding panel edges and underlying and supporting the occupant's buttock and legs.

Another object of this invention is to provide on the underside of the seat panel a pocket structure having a front opening for removably supporting a potty pan therein in operative underlying relation to the seat panel opening, allowing toilet use into the potty pan, and further having the potty pan reachable from the front of the wheelchair by its occupant to remove, empty and replace while yet sitting in the wheelchair, allowing unassisted toilet use.

Yet another object of this invention is to provide that the pocket structure itself is removably connected to the seat panel, as by having flat side flanges and mating Velcro type hook-loop fastening means respectively connected to the flanges and the underside of the seat panel adjacent the opening, suited for toilet use then over a conventional toilet bowl.

BRIEF DESCRIPTION OF THE DRAWINGS

These and other objects, features or advantages of the invention will be more fully understood and appreciated after consideration of the following description of the invention, which includes as a part thereof the accompanying drawings, wherein.

DETAILED DESCRIPTION OF A PREFERRED EMBODIMENT OF THE INVENTION

Figure 2:
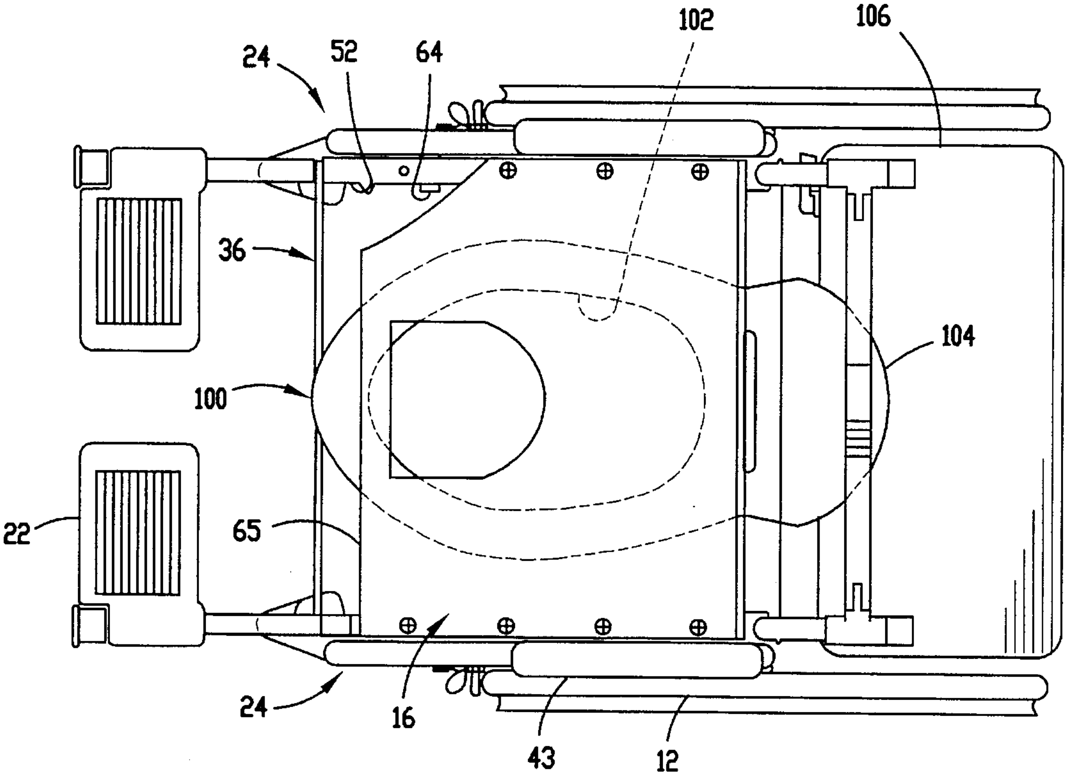
FIG. 2 is a top plan view of the wheelchair of FIG. 1, again shown positioned operatively over a conventional toilet.

The invention disclosed herein is embodied in a collapsible wheelchair 10 having components including spaced rear wheels 12, smaller front caster wheels 14, seat 16, back 18, rear handles 20 and foot rests 22.

The wheelchair 10 is formed with two unitary side structures 24 each comprised of elongated bar or tube members 26, 28, 30 and 32 connected together by welds or the like, and lateral braces including X-cross braces 36, and locking braces 38, 40 and 42 between the side structures 24. Arm rests 43 are removably supported off of the vertical bar members from sockets 44.

The back 18 is commonly comprised of a flexible durable sheet or panel of vinyl, leather, canvas or the like (preferably waterproofed) secured at its side edges to the upper end of the vertical rear bar members 26, and the handles 20 are likewise bent off of these bar members 26. The wheels 12 are rotated about spindles 46 connected by welds or the like to the same rear bar members 26, while the wheels 14 are connected off of the front vertical bar members 30. Wheels 12 and 14 roll along a support surface, and are spaced apart to stably support the wheelchair during its use.

A seat frame 50 is supported to move along linear paths toward and away from the support surface, in a direction parallel to the side structure bar members 26 and 30 when opening and collapsing the wheelchair. Specifically, the seat frame 50 has elongated bar members 52 that parallel the underlying side structure bar members 32, each being connected by a slide 54 to the rear vertical bar member 26 and by vertical bar member 55 welded or otherwise connected thereto and suited to slide telescopically within or relative to front bar member 30.

The X-cross brace 36 has elongated bar members pivoted to one another near their centers at 57; while each lower end is pivoted at 58 to a respective side structure 24 near the lower end of the vertical front bar member 30 and each upper end is pivoted at 59 to the seat frame 50 at the front of the seat frame bar member 52 of the other respective side structure.

Telescoping members 60 and 62 respectively welded or otherwise connected to the side structure bar members 28 and to the seat frame bar members 52, cooperate slidable with one another to allow the side structures 24 and seat frame 50 to be easily shifted relative to one another as the wheelchair is opened or collapsed, and further to add rigidity and strength to the wheelchair in withstanding normal dynamic loads during use.

Spacers 64 welded or otherwise connected to the bar members 32 have cradle means at the upper ends thereof that butt against and restrain the bar members 52 when the wheelchair is opened, but that allow the separation of the bar members 32 and 52 relative to one another when the wheelchair is collapsed.

Figure 7:
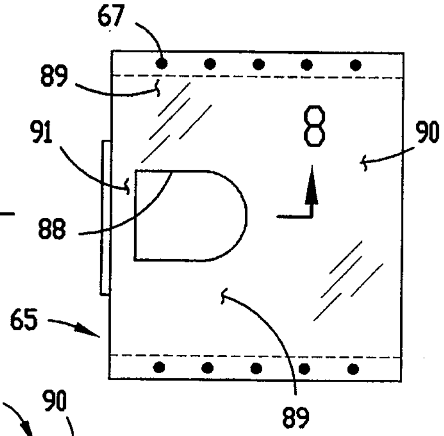
FIG. 7 is a top plan view of the seat panel suited for use in the wheelchair of the previous figures.
Figure 10:
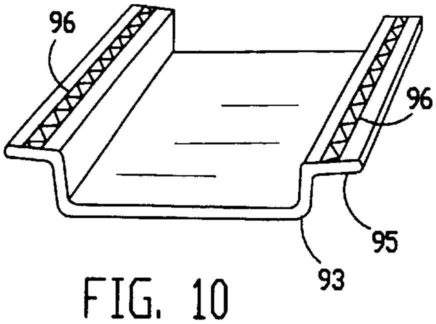
FIG. 10 is a perspective view of the potty pan holding panel suited for use in the wheelchair of the previous figures.
Figure 8:
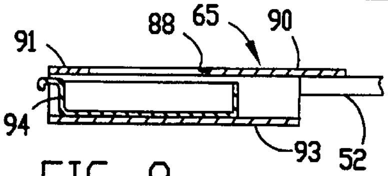
FIG. 8 is a sectional view as seen generally from line 8—8 in FIG. 7, except of the seat when mounted in a wheelchair and showing a pan positioned operatively in place.
Figure 6:
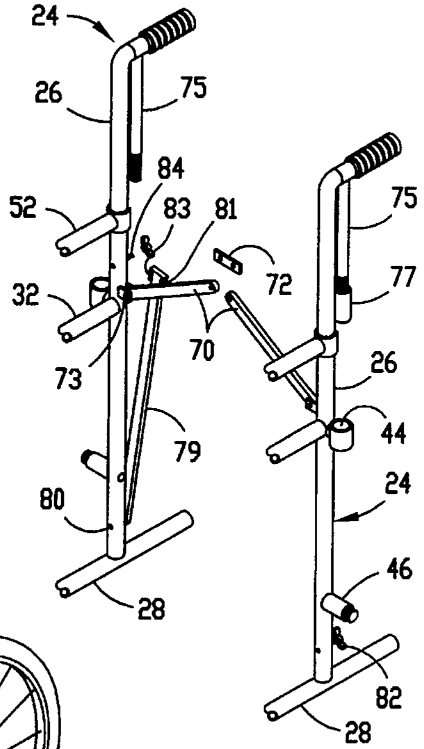
FIG. 6 is a perspective view similar to FIG. 5 of lateral braces used in the wheelchair of FIG. 5, except shown in positions corresponding to the wheelchair being in a partially collapsed orientation.
Figure 5:
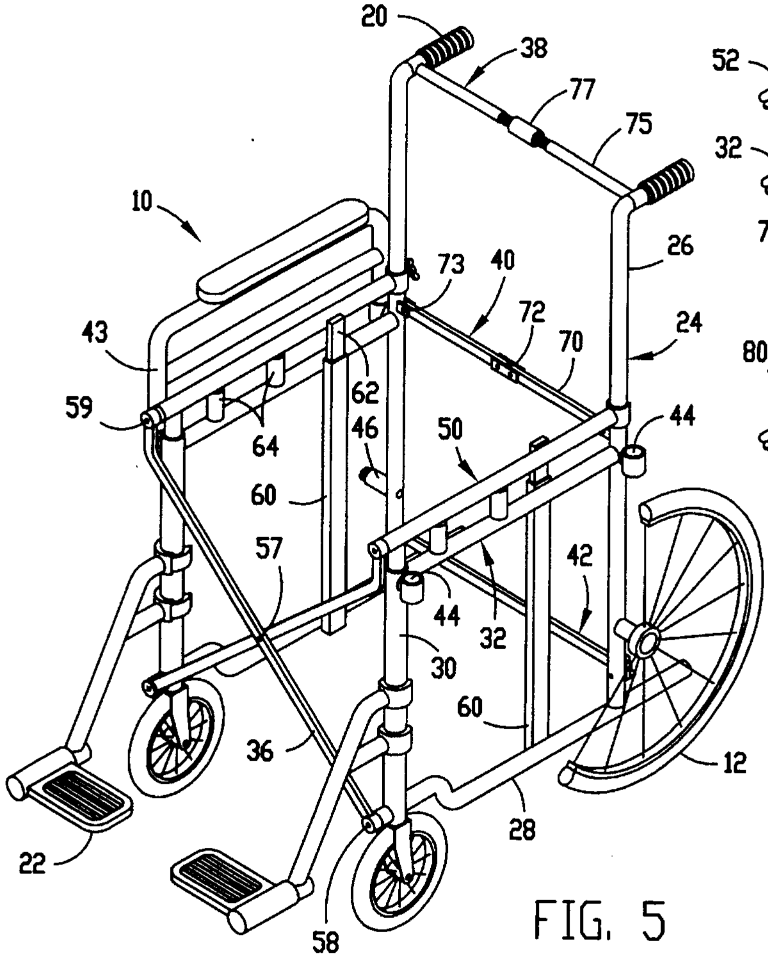
FIG. 5 is a perspective view of the wheelchair of the previous figures, except showing it with certain components including the seat and back panels removed for clarity of disclosure.

The seat 16 is comprised of a flexible durable panel 65 (FIG. 7) of vinyl, leather, canvas or the like (preferably waterproofed) secured at its side edges by screws 67 or the like threaded into openings in the bar members 52.

Figure 1:
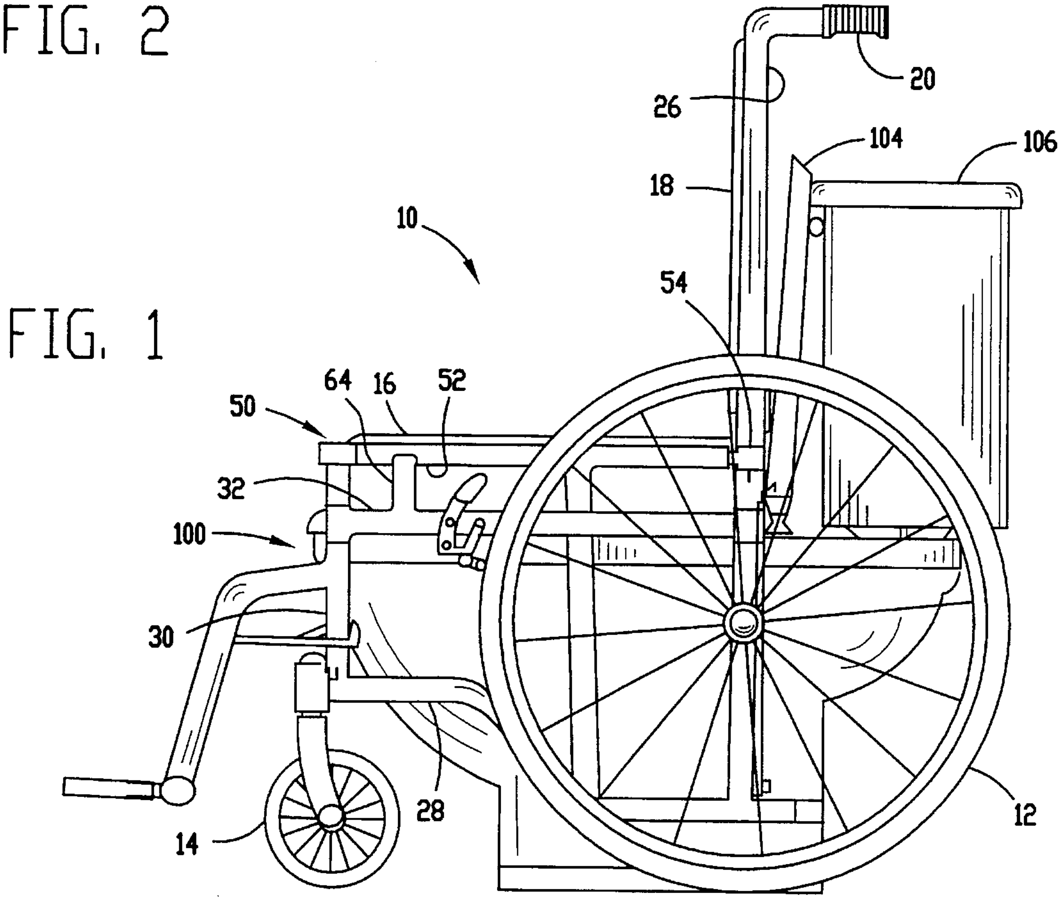
FIG. 1 is a side elevational view of a wheelchair formed according to the invention, showing it positioned operatively over a conventional toilet.
Figure 4:
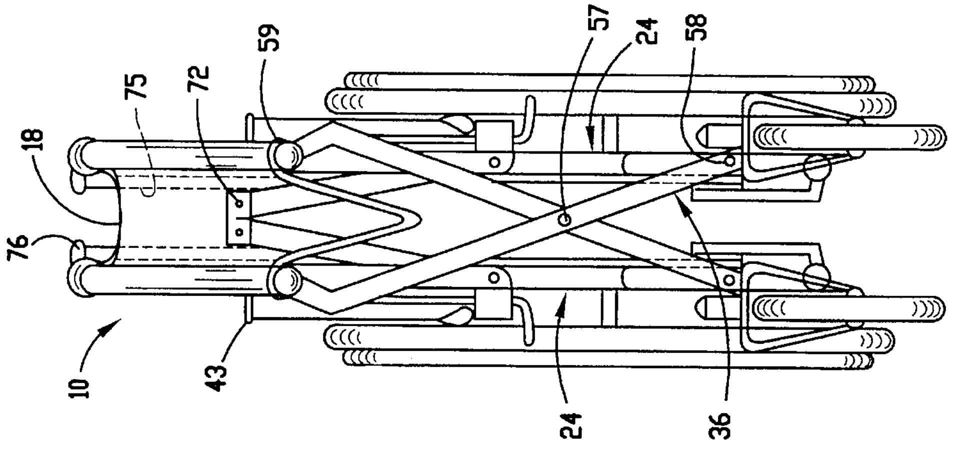
FIG. 4 is a front elevational view of the wheelchair of FIG. 3, again shown folded in a collapsed position.
Figure 3:
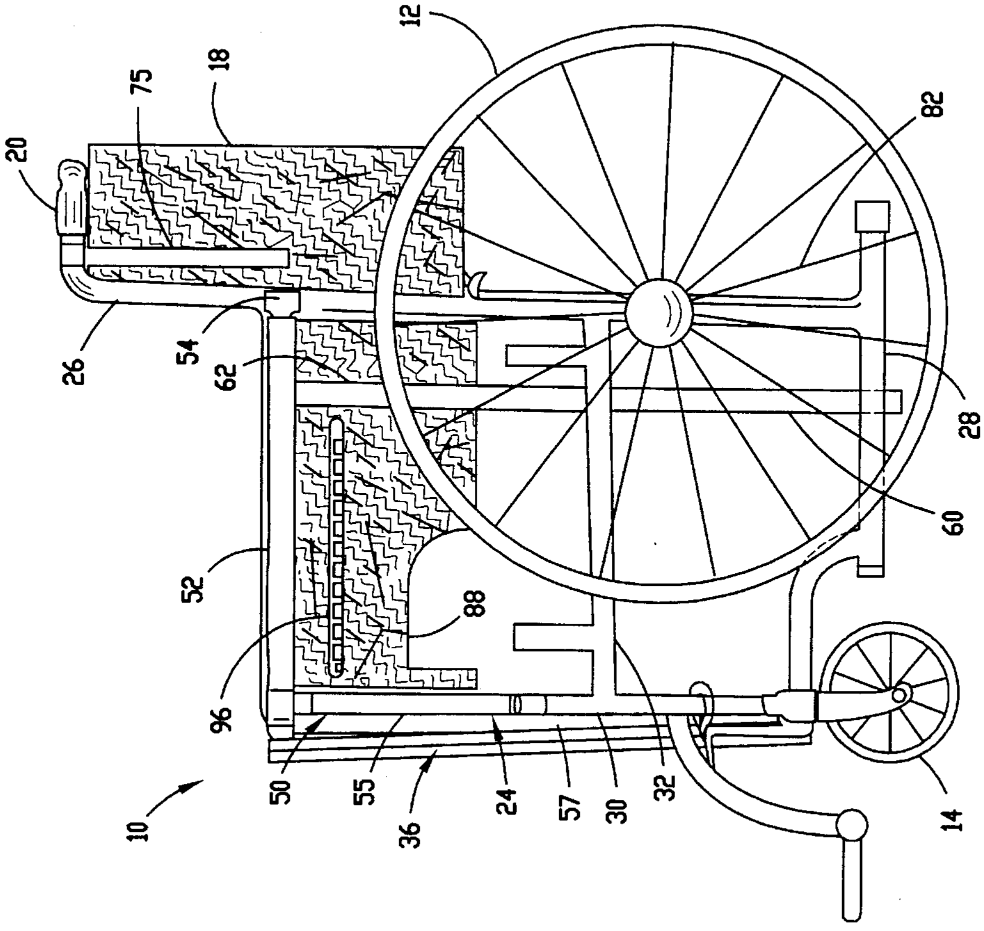
FIG. 3 is a side elevational view of the wheelchair of FIG. 1, except showing it folded in a collapsed position.
Figure 9:
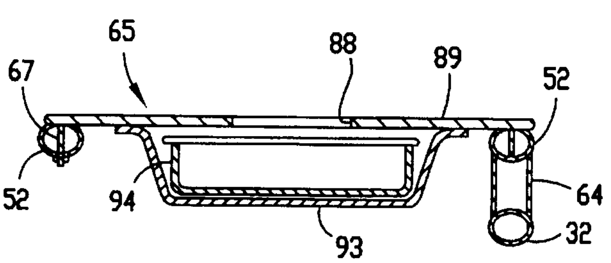
FIG. 9 is a front elevational view of the seat assembly of FIG. 8.

When the wheelchair 10 is opened (FIGS. 1 and 2), the panels of the seat 16 and back 18 are drawn to somewhat stretched although not really tight or flat configurations, allowing the occupant to sink into the panels for added comfort when occupying the wheelchair. When the wheelchair 10 is collapsed (FIGS. 3 and 4), each panel of the seat 16 and back 18 is folded approximately in half generally down the middle, to have the side structures 24 disposed closely adjacent one another in a compact arrangement.

The lateral locking brace 40 is formed of two links 70 pivoted together at their inboard ends via piece 72, generally centered between the side structures, and pivoted at their outboard ends 73 to the vertical rear side structure members 26. When the wheelchair 10 is opened, the links 70 are aligned or biased slightly over-center; whereas when the wheelchair is being or is collapsed, the links are angled upwardly in front of the rearwardly folded back 18. This lateral brace 40 is operative and interconnects the side structures 24 and holds them spaced apart when the wheelchair 10 is opened and occupied.

The lateral brace 38 is formed of two links 75 each pivoted at their outboard ends at 76 to the side structures 24 near the upper ends of the vertical rear bar members 26, and connected together near their inboard ends by a sleeve 77 rotatably trapped on one link and threaded onto an end portion of the other link to tie them rigidly together, again generally centered between the side structures. The connected links of the brace 38 add rigidity and strength to the opened wheelchair particularly near the handles 20. However, use of the brace 38 is somewhat optional as lateral brace 40 will hold the wheelchair opened. When not used, the links 75 will extend generally parallel to the bar members 26 and can be held in place by engaged Velcro-type hook-loop fastening means (not shown).

The lateral brace 42 is formed of a single link 79 pivoted at its lower end 80 to one side structure 24 at bar member 26, with its upper end having an open notch 81 suited to fit over a stud 82 welded or otherwise connected to the bar member 26 on the other side structure 24, where a wing nut or the like can be tightened onto the stud to hold the link firmly on the stud with the wheelchair opened. When it is necessary to release the link 79, or if its use is not needed, its upper end has an open notch 83 suited to fit over a stud 84 secured to its side structure 24, where again a wing nut or the like can be tightened onto the stud to hold the link on the stud with the link somewhat parallel to the elongated bar member 26. The lateral brace 42 is optional, though being particularly effective as it is proximate the rear wheels 12, for holding the wheelchair 10 opened and rigid against twisting or shifting of the side structures 24, etc. relative to one another when the wheelchair is subjected to dynamic loads, such as when rolling over an uneven surface, curb or the like.

The flexible seat panel 65 has an opening 88 formed therein spaced from its front, rear and side edges, suited thereby when mounted on the seat frame 50 to provide seat support regions along the spaced sides 89, rear 90 and front 91. The opening 88 is rounded at its rear edge, which will be spaced forward of the seat center, leaving the rear region 90 deep front-to-rear for full support of an occupant's bottom, under and forward of the tail bones. Likewise, the opening 88 is extended only a few inches to each side of the lateral seat center (perhaps between three and five inches compared to a seat width of between 15–20 inches) leaving wide side regions for fully supporting the occupant's legs. The front region 91 may be an inch or so wide, yet providing a continuous front edge and a stable but yielding seat support. A wheelchair occupant can thereby sit on the yielding seat panel 65 for long periods, even with the opening 88, as the occupant's body under the buttock and legs is not lacking support due to the existence of the opening 88.

On the underside of the seat panel 65, a pocket structure 93 having a front opening is provided for removably supporting a potty pan 94 therein in operative underlying relation to the seat opening 88. The potty pan 94 can have a forward lip that would project sufficiently in front of the seat panel to allow the wheelchair occupant, while sitting in the wheelchair, to reach and remove, empty, and replace the bed pan relative to the pocket structure. Preferably, the pocket structure 93 is itself removably connected to the seat panel 65, as by having flat side flanges 95, and mating hook and loop components of Velcro type hook-loop fastening means 96 respectively connected to the side flanges and to the underside of the seat panel 65 on the side regions adjacent the opening 88.

The upper ends of the X-cross bars immediately next to pivot connections 59 with the seat frame are bend to provide a short portion that lies, with the wheelchair opened, generally parallel to the adjacent vertical front bar member 30 until under front edge of the seat panel 65, whereupon the bars are angled generally straight across to the opposite side structure pivot 58. This minimizes interference between the occupant's legs and the X-cross bars.

As part of the invention, the wheelchair 10 is designed to fit over a conventional toilet 100 (illustrated in FIGS. 1 and 2) having an underlying bowl 102 and a seat 104 hinged to the bowl at its rear and suited to be pivoted to lowered and raised positions. In domestic toilets, a water closet 106 upstands from the bowl 102 at its rear; while commercial toilets may not have such a structure but instead have a vertical water pipe (not show) that would enter the bowl generally near the same top rear location. Most toilet bowls are less than about 16 inches high, while handicap toilet bowls are almost 19 inches high; meaning that the wheelchair seat frame 50, the suspended seat panel 65, and the lateral locking brace 40 are spaced above the supporting floor surface more than 20 inches.

Likewise, the wheelchair seat 16 would be approximately 18 inches wide and 16 inches deep front-to-rear, and the outside-to-outside distance across the wheels 12 would be approximately 25 inches, similar to standard wheelchairs. Larger or smaller size wheelchairs are also commonly used, for children or larger frame occupants, and the disclosed wheelchair could be made to related sizes. Of interest further, the X-cross braces 36 would be pivoted off the front edges of the unitary side structures 24 and the seat support frame 50.

To use the wheelchair 10 directly with the toilet 100, the lower lateral cross brace 42 is first raised and locked in place on the stud 84, and the pocket structure 93 is removed completely from the underside of the seat panel 65. This opens the entire space rearwardly of the X-cross braces 36 under and rearwardly of the seat frame 50 and between the side structures 24, meaning that no obstructions are in this space that would prevent the wheelchair from being backed up to have the wheels 12 straddle the toilet bowl 102 and to align the seat opening 88 over the top opening of the toilet bowl.

In many washrooms having sufficient lateral clearances, the wheelchair occupant can maneuver the wheelchair without assistance backwardly over the toilet bowl. Public washrooms, particularly with toilet stalls meeting handicap codes, generally will allow this maneuver. When properly positioned, the wheelchair occupant would remove any blocking garment (pants, skirt, underpants, etc.) in the way, by rocking from side-to-side on the seat 16 and pulling the garment from under the occupant's seat, to position such around and overlying the legs forwardly of the seat 16 or between the person and the wheelchair back 18. Thereafter, further rocking would allow the occupant to shift forwardly until one's buttock would overlie the opening 88. The occupant in this position would yet have sufficient bearing support in the wheelchair, with the buttock or tail bones on the rear and/or side support regions, and the front wheels 14 will yet be sufficiently forward of the occupant's center of Gravity to maintain wheelchair stability.

When finished, any paper wiping can take place by reaching through the seat opening 88, or by other appropriate efforts. The occupant can then reposition the removed garment(s) to a properly dressed manner and maneuver rearwardly to be positioned properly in the wheelchair, again by side-to-side and rearward rocking movements. The occupant could further maneuver the wheelchair clear of the toilet and from the washroom.

In certain instances, the size of the toilet stall or washroom can be too small to allow the wheelchair to be maneuvered over the toilet, or should no toilet be available, whereupon the pocket structure 93 can be secured on the underside of the seat panel 65, and the potty pan 94 can be positioned thereon in operative underlying relation to the seat opening 88. As mentioned above, the wheelchair occupant typically could without assistance position the potty pan 94 relative to the pocket structure 93. By way of example, the potty pan 94 can be between approximately 6–10 inches square and between 1–4 inches deep. For simplicity of structure, the pocket structure 93 need only be a generally flat sheet the might be slightly pre-creased to its final shape as illustrated, with the rear end being open.

It can be appreciated that the disclosed wheelchair has great versatility in that it serves both as a full-time chair and carrier of its occupant and as an emergency or intended commode for the occupant. Its durable and rigid construction offers stable use, with assistance in manually pushing it over typical outside irregular or rough surfaces, even curbs, or as a self propelled vehicle. Further, the wheelchair can be easily collapsed to a compact configuration for vehicle or other form of shipment between different sites of use, or for storage. The flexible but self-contouring seat panel offers full body contact and support for long term sitting and use, while the opening therein allows toilet use in combination with a regular toilet or independently thereof as a commode.

While a specific embodiment has been illustrated, it will be obvious that minor changes could be made therefrom without departing from the spirit of the invention. Accordingly, the invention is to determined by the scope of the following claims.

What is claimed is:

1. A wheelchair for universal use, including long term sitting and for toilet needs without assistance and/or leaving the wheelchair, comprising spaced side structures, wheels rotatably mounted on the side structures for rolling along a surface, and seat frame structures movably connected to the side structures;

means interconnecting the side structures and the seat frame structures for moving between opened and collapsed wheelchair positions respectively with the side structures spaced apart and closely adjacent one another;

a flexible durable seat panel secured along panel side edges to the seat frame structures and extended to spaced front and rear edges, said seat panel having an opening therein spaced from the front, rear and side panel edges, and defining side and rear support regions between the opening and the corresponding panel edges;

said seat panel in the wheelchair opened position being drawn to stretched although not tight or flat configurations, allowing a wheelchair occupant to be carried on the seat panel with the rear and side support regions underlying the occupant's buttock and legs and allowing also the wheelchair occupant to shift the buttock along the seat panel to overlie the seat opening for toilet needs;

the seat frame structures and seat panel in the wheelchair opened position being spaced sufficiently above the surface to provide vertical clearance over the top of a toilet bowl; and said interconnecting means being at front edges of the side structures and seat frame structures and comprising X-cross braces having elongated members pivoted together near their centers and means pivoting lower ends thereof respectively to the side structures and means pivoting upper ends thereof to the seat frame structures of the other respective side structure, so that rearwardly of the X-cross braces and under the seat frame structures and between the side structures no wheelchair structure exist that would prevent the wheelchair from being rolled backwards to have the wheels straddle the toilet bowl and to align the seat panel opening vertically over the toilet bowl.

2. A wheelchair for universal use according to claim 1, further comprising pocket structure on the underside of the seat panel and having a front opening, and a potty pan suited to be positioned via the front opening in the pocket structure in operative underlying relation to the seat panel opening.

3. A wheelchair for universal use according to claim 2, the pocket structure further being a generally flat sheet with flat side flanges, and mating hook and loop components of hook-loop fastening means respectively connected to the side flanges and to the underside of the seat panel on the side regions adjacent the opening for removably connecting the pocket structure sheet to the seat panel.

4. A wheelchair for universal use according to claim 1, the panel opening further being rounded at its rear edge and having such rear opening edge spaced forward of the seat panel center between the front and rear seat panel edges, leaving the rear support region deep front-to-rear for full long term support of an occupant's buttock and under the tail bones, the opening further being extended only a few inches to each side of the lateral seat center between the side panel edges compared to a seat width of between 15–20 inches leaving wide side support regions for full long term support of the occupant's legs, and the seat panel in front of the opening being an inch or so wide and providing a continuous front support region and a stable but yielding seat panel support.

5. A wheelchair for universal use according to claim 1, each side structure further having front and rear tube members and an interconnecting upper tube member, the seat frame structures having two bar members one each being respectively parallel to the upper tube member of each side structure, and means connecting the seat frame bar members to slide vertically relative to the side structure front and rear tube members when shifted between the wheelchair opened and collapsed positions.

6. A wheelchair for universal use according to claim 5, further comprising telescoping members connected respectively between the side structure upper tube members and seat frame bar members operable for adding rigidity to the wheelchair when shifted between the wheelchair opened and collapsed positions.

7. A wheelchair for universal use according to claim 5, further comprising spacers connected to the side structure upper tube member suited to butt against the seat frame bar member for positioning the seat frame structures relative to the side structures in the wheelchair opened position.

8. A wheelchair for universal use according to claim 5, the means connecting the seat frame bar members to the side structure tube members further including a front bar member connected to each seat frame bar member operable to telescope relative to the front tube member and slide means on each seat frame bar member operable to cooperate movably along the rear tube member, and spacers connected to the side structure upper tube member suited to butt against the seat frame bar member for positioning the seat frame structures relative to the side structures in the wheelchair opened position.

9. A wheelchair for universal use according to claim 8, further comprising telescoping members connected respectively between the side structure upper tube members and seat frame bar members operable for adding rigidity to the wheelchair when shifted between the wheelchair opened and collapsed positions.

10. A wheelchair for universal use according to claim 9, the means pivoting the lower ends of the elongated X-cross brace members respectively to the side structures further being to the front side of the tube members thereof, and the means pivoting the upper ends of the elongated X-cross brace members respectively to the seat frame structures further being on the front side of the vertical bar members.

11. A wheelchair for universal use according to claim 9, further comprising a flexible back panel secured at its side edges to the side structure rear tube members, lateral braces connected between the side structures suited to lock them in the wheelchair opened position, the lateral braces having two links pivoted together at the approximate mid-point between the side structures and at their outboard ends to intermediate the side structure rear tube members, the opened wheelchair having the links aligned or biased slightly over-center and the collapsed wheelchair having the links angled upwardly in front of the rearwardly folded back panel.

12. A wheelchair for universal use according to claim 9, further comprising upper and lower lateral braces connected between the side structure rear tube members respectively near their upper and lower ends for holding the opened wheelchair rigid when occupied, and means to hold the lower lateral brace disengaged and out of the way even with the wheelchair opened and occupied, allowing rearward movement over the toilet bowl.

13. A wheelchair for universal use according to claim 9, further comprising a pocket structure on the underside of the seat panel, the pocket structure having a front opening and otherwise generally underlying the seat opening, and a potty pan suited to be positioned via the front opening in the pocket structure in operative underlying relation to the seat panel opening.

14. A wheelchair for universal use according to claim 13, the pocket structure further, being a generally flat sheet with flat side flanges, and mating hook and loop components of hook-loop fastening means respectively connected to the side flanges and to the underside of the seat panel on the side regions adjacent the seat panel opening for removably connecting the pocket structure sheet to the seat panel.

15. A wheelchair for universal use according to claim 1, the panel opening further being rounded at its rear edge and having such rear opening edge spaced forward of the seat panel center between the front and rear seat panel edges, leaving the rear support region deep front-to-rear for full long term support of an occupant's buttock and under the tail bones, the panel opening further being extended only a few inches to each side of the lateral seat center between the side panel edges compared to a seat width of between 15–20 inches leaving wide side support regions for full long term support of the occupant's legs, and the seat panel in front of the panel opening being an inch or so wide and providing a continuous front support region and a stable but yielding seat panel support.

16. For a universal use wheelchair, including for long term sitting and for toilet needs without assistance and/or leaving the wheelchair, a seat combination comprising a flexible durable seat panel and means along panel side edges adapted to secure the seat panel to side structures of a wheelchair, and said seat panel adapted to be extended to spaced front and rear edges;

said seat panel having an opening therein spaced from the front, rear and side panel edges, and defining front, rear, and side support regions between the opening and the corresponding panel edges;

said seat panel being drawn with the wheelchair opened to a stretched although not tight or flat configuration, allowing a wheelchair occupant to be carried on the seat panel with the rear and side support regions underlying the occupant's buttock and legs and allowing also the wheelchair occupant to undress as needed and to shift the buttock along the seat panel to overlie the seat opening for toilet needs; and pocket structure having a front opening on the underside of the seat panel, and a potty pan suited to be positioned via the front opening in the pocket structure an operative underlying relation to the seat panel opening.

17. A universal use wheelchair seat combination according to claim 16, the pocket structure further being a generally flat sheet with flat side flanges, and mating hook and loop components of hook-loop fastening means respectively connected to the side flanges and to the underside of the seat panel on the side regions adjacent the opening for removably connecting the pocket structure sheet to the seat panel.

18. A universal use wheelchair seat combination according to claim 16, the seat panel opening further being rounded at its rear edge and having such rear opening edge spaced forward of the seat panel center between the front and rear panel edges leaving the rear support region deep front-to-rear for full long term support of an occupant's buttock and under the tail bones, the seat panel opening further being extended only a few inches to each side of the lateral seat panel center between the side seat panel edges compared to a seat width of between 15–20 inches leaving wide side support regions for full long term support of the occupant's legs, and the front region being an inch or so wide and providing a continuous front seat panel edge and a stable but yielding seat panel support.

19. A universal use wheelchair seat combination according to claim 18, the pocket structure further being a generally flat sheet with flat side flanges, and mating hook and loop components of hook-loop fastening means respectively connected to the side flanges and to the underside of the seat panel on the side regions adjacent the opening for removably connecting the pocket structure sheet to the seat panel.

20. A universal use wheelchair seat combination according to claim 16, the potty pan further having a gripping portion sized and suited with the potty pan in operative underlying relation to the seat panel opening to project in front of the seat panel front edge sufficiently to allow the potty pan to be gripped by a wheelchair occupant, while sitting in the wheelchair, to remove, empty and replace it relative to the pocket structure.

* * * * *